US011078919B2

(12) United States Patent
Tokunaga et al.

(10) Patent No.: US 11,078,919 B2
(45) Date of Patent: Aug. 3, 2021

(54) SEAL DEVICE

(71) Applicant: EAGLE INDUSTRY CO., LTD., Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Hidetoshi Kasahara, Tokyo (JP); Jun Hiromatsu, Tokyo (JP); Yasuhiro Kuroki, Tokyo (JP); Ryu Kikuchi, Tokyo (JP)

(73) Assignee: EAGLE INDUSTRY CO., LTD, Tokyo (JP)

( * ) Notice: Subject to any disclaimer, the term of this patent is extended or adjusted under 35 U.S.C. 154(b) by 132 days.

(21) Appl. No.: 16/483,655

(22) PCT Filed: Feb. 21, 2018

(86) PCT No.: PCT/JP2018/006093
§ 371 (c)(1),
(2) Date: Aug. 5, 2019

(87) PCT Pub. No.: WO2018/155462
PCT Pub. Date: Aug. 30, 2018

(65) Prior Publication Data
US 2020/0011342 A1   Jan. 9, 2020

(30) Foreign Application Priority Data

Feb. 22, 2017   (JP) .............................. JP2017-030760

(51) Int. Cl.
*F16J 15/44*      (2006.01)
*F04D 29/12*      (2006.01)

(52) U.S. Cl.
CPC ............ *F04D 29/12* (2013.01); *F16J 15/441* (2013.01); *F05D 2240/55* (2013.01)

(58) Field of Classification Search
CPC ........ F16J 15/44; F16J 15/441; F16J 15/3444; F16J 15/43; F04D 29/12; F05D 2240/55
See application file for complete search history.

(56) References Cited

U.S. PATENT DOCUMENTS

2009/0121440 A1*   5/2009   Feistel ..................... F16J 15/26
                                                                277/308
2020/0018400 A1*   1/2020   Tokunaga ................ F16J 15/54

FOREIGN PATENT DOCUMENTS

CN   205841748 U   * 12/2016
JP   S52129866 A     10/1977
JP   S57154562 A      9/1982

OTHER PUBLICATIONS

International Search Report (ISR) dated Apr. 17, 2018, issued for International application No. PCT/JP2018/006093. (1 page).

* cited by examiner

*Primary Examiner* — Gilbert Y Lee
(74) *Attorney, Agent, or Firm* — Law Office of Katsuhiro Arai

(57) ABSTRACT

In an exemplary embodiment, a seal device 10 that seals between a housing 11 and a rotation shaft 20 passing through the housing 11 includes a floating ring 15 arranged with a gap h with respect to the rotation shaft 20, wherein the floating ring 15 includes at least one supporting means 18 that supports in the circumferential direction. In the seal device, the floating ring follows movement of the rotation shaft even upon running for a long time, a clearance between the rotation shaft and the seal ring can be properly held, and the sealing operation by the floating ring and the vibration damping function can be exerted, and the seal device is easily assembled.

2 Claims, 3 Drawing Sheets

SEAL DEVICE

CROSS-REFERENCE TO RELATED APPLICATIONS

This application is the U.S. National Phase under 35 U.S.C. § 371 of International Application PCT/JP2018/006093, filed Feb. 21, 2018, which claims priority to Japanese Patent Application No. JP2017-030760, filed Feb. 22, 2017. The International Application was published under PCT Article 21(2) in a language other than English.

TECHNICAL FIELD

The present invention relates to a seal device that seals between a housing and a rotation shaft passing through the housing, and in particular, relates to a seal device including a floating ring used for a rotation shaft of a fluid machine such as a pump.

BACKGROUND ART

Conventionally, in a rotating fluid machine such as a pump, in order to seal a fluid, a floating seal is used, and the floating seal shown in FIG. 3 is known (hereinafter, called as "Conventional Art 1," for example, refer to Patent Citation 1.) This conventional art includes a rotation shaft 45 of a fluid machine, a sleeve 44 attached to an outer periphery of the rotation shaft 45 and rotated integrally with the rotation shaft, a seal ring 41 loosely fitted to the sleeve 44 while having a clearance, plate springs 46 provided at four points of an outer periphery of the seal ring 41, and a retainer 42 that accommodates the seal ring 41, and in a state where projections 46A of the plate springs 46 are engaged with grooves 42A provided in the retainer 42, the seal ring 41 is supported by the plate springs 46. By the wedge effect (effect of dynamic pressure generated in a wedge portion) generated between an inner peripheral face of the seal ring 41 and the sleeve 44 of the rotation shaft 45 and the Lomakin effect (aligning effect by flow losses of a fluid between surfaces of a seal ring and a shaft at the time of generation of a seal pressure difference), a gap between the inner peripheral face of the seal ring 41 and the sleeve 44 attached to the rotation shaft 45 is held to be fixed, and the seal ring 41 is pressed in the axial direction from the high pressure fluid side to the retainer 42 side, so that the seal ring 41 and the retainer 42 are tightly sealed.

CITATION LIST

Patent Literature

Patent Citation 1: JP 57-154562 A

SUMMARY OF INVENTION

Technical Problem

However, in Conventional Art 1, the outer periphery of the seal ring 41 and the plate springs 46 are in contact with each other while being always relatively displaced in the radial direction and the circumferential direction. Thus, upon running for a long time, surface roughening occurs at contact portions X between the outer periphery of the seal ring 41 and the plate springs 46, and the seal ring 41 and the plate springs 46 are anchored to each other. Therefore, the seal ring 41 may sometimes be incapable of following movement of the rotation shaft 45. The projections 46A of the plate springs 46 may sometimes be worn away or deformed in the grooves 42A of the retainer 42, and the plate springs 46 may be incapable of following movement of the seal ring 41. As a result, the seal ring 41 and the plate springs 46 cannot follow the movement of the rotation shaft 45 and an automatic aligning operation is lost. Thus, there are possibilities that the rotation shaft 45 and the seal ring 41 are brought into contact with each other and damaged, and that a radial gap is increased more than an optimal value and a proper sealing operation cannot be obtained.

Further, in Conventional Art 1, assembling takes a lot of time and care. That is, in a case where the plate springs 46 are provided in the retainer 42 and then the seal ring 41 is inserted into the retainer 42, the plate springs 46 have to be temporarily compressed to ensure a gap for inserting the seal ring 41. Conversely, in a case where the seal ring 41 is arranged in the retainer 42 in advance and then the plate springs 46 are provided in the retainer 42, the plate springs 46 have to be compressed and arranged to ensure a gap between the retainer 42 and the seal ring 41. Thus, assembling takes a lot of time and care.

The present invention is achieved focusing on such a problem, and an object thereof is to provide a seal device in which a floating ring follows movement of a rotation shaft even upon running for a long time, a clearance between the rotation shaft and the floating ring can be properly held, and a sealing operation by the floating ring and a vibration damping function can be exerted, the seal device to be easily assembled.

Solution to Problem

In order to solve the foregoing problem, a seal device of the present invention is a seal device that seals between a housing and a rotation shaft passing through the housing, the seal device being characterized by including a floating ring arranged with a gap with respect to the rotation shaft, the seal device being characterized in that the floating ring includes at least one supporting means that contactlessly supports in the circumferential direction.

According to this aspect, since the floating ring is contactlessly supported in the circumferential direction, the floating ring is not restricted by the housing. The floating ring follows movement of the rotation shaft even upon running for a long time, a sealing operation can be exerted, and the floating ring can be easily installed in the supporting means.

The seal device of the present invention is characterized in that the supporting means is arranged symmetrically with respect to a vertical line passing through center of the floating ring.

According to this aspect, the floating ring can be supported by the supporting means in the circumferential direction and the radial direction. Thus, a clearance between the rotation shaft and the floating ring can be properly held, and the sealing operation can be exerted.

The supporting means includes a first magnet arranged in the housing, the first magnet having a magnetic pole face directed in the circumferential direction, and a second magnet arranged in the floating ring, the second magnet having a magnetic pole face directed in the circumferential direction, and the first magnet and the second magnet are arranged so that the same poles oppose each other.

According to this aspect, since the floating ring is pressed by circumferential repulsion force of the magnets, movement of the rotation shaft is restricted via the floating ring. Thus, vibration of the rotation shaft can be reduced.

The seal device of the present invention is characterized in that magnetic pole adjacent faces of the first magnet and the second magnet where the N pole and the S pole are adjacent to each other are respectively surrounded by a non-magnetic material.

According to this aspect, leakage flux of permanent magnets can be reduced. Thus, magnetic force can be efficiently utilized.

DESCRIPTION OF EMBODIMENTS

A mode for carrying out a seal device according to the present invention will be described in detail with reference to the drawings. However, the present invention is not interpreted while being limited to this. As long as not departing from the scope of the present invention, various modifications, corrections, and improvements can be added based on the knowledge of those skilled in the art.

Figure 1:
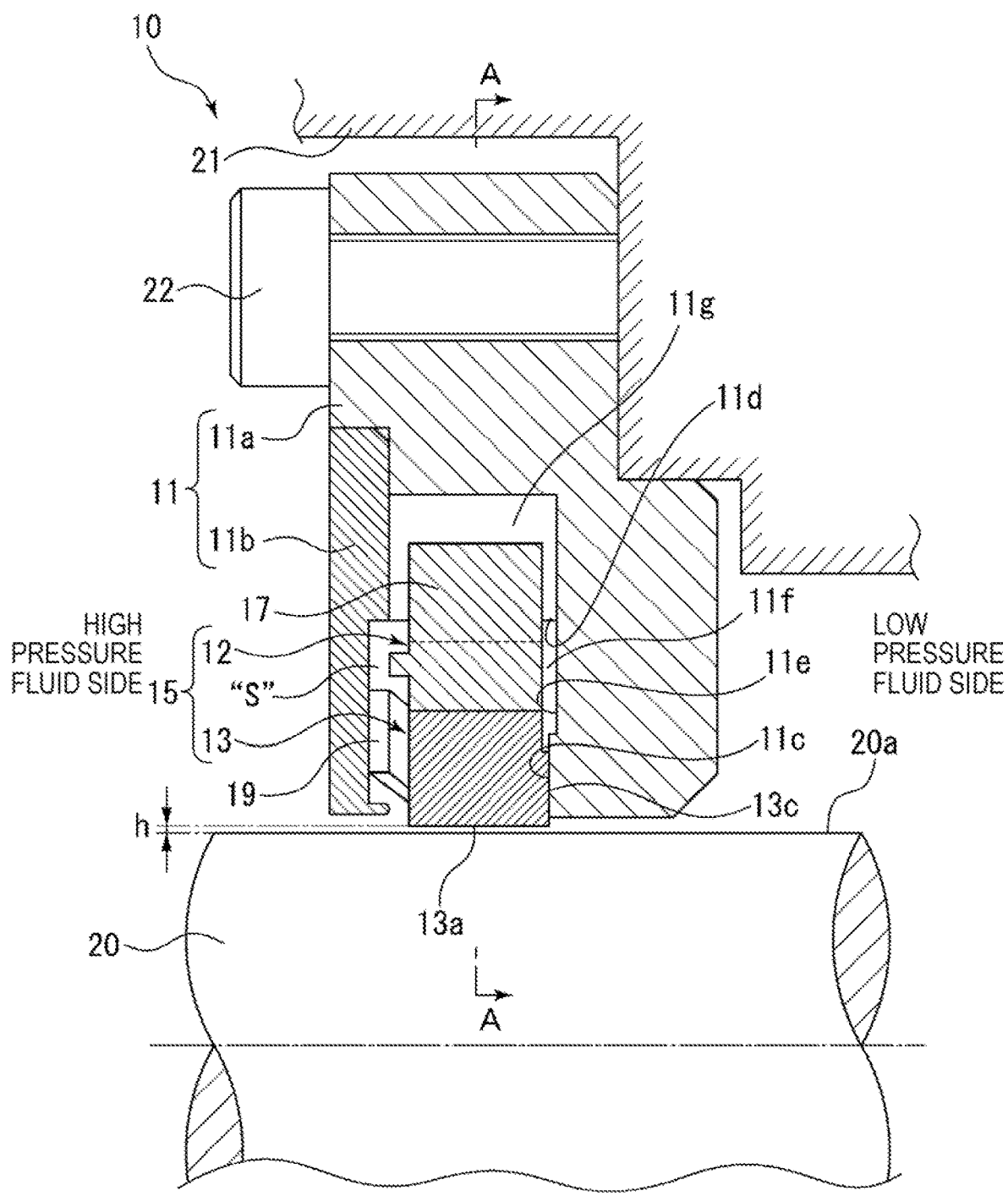
FIG. 1 is a front sectional view of a seal device according to an embodiment of the present invention.

A seal device 10 according to an embodiment of the present invention will be described with reference to FIGS. 1 and 2. A rotation shaft 20 of a fluid machine is arranged so as to pass through a casing 21, and the left side is the high pressure side and the right side is the low pressure side. The seal device 10 is mainly formed by a floating ring 15, and a housing 11 that accommodates the floating ring 15.

The housing 11 is mainly formed by a holder 11a and a flange 11b. The holder 11a is fixed to the casing 21 by a fastening means 22. Each of the holder 11a and the flange 11b has a predetermined gap from the rotation shaft 20, and has a hole through which the rotation shaft 20 passes. An inner peripheral portion of the holder 11a has an accommodation portion 11f surrounded by an inner peripheral wall portion 11d and a radial wall portion 11e. The floating ring 15 is accommodated in a space S surrounded by the inner peripheral wall 11d of the housing 11, the radial wall 11e and the flange 11b respectively partitioning the inner peripheral wall 11d in the axial direction, and the rotation shaft 20 passing through the housing 11. Plural (four in the present embodiment) recessed portions 11g extending to the radially outside are formed in part of the inner peripheral wall portion 11d of the holder 11a at equal intervals in the circumferential direction. A pair of permanent magnets 14 (first magnet of the present invention) is attached to each of the recessed portions 11g while being separated from each other in the circumferential direction. Further, the radial wall portion 11e has a holder side secondary seal face 11c slightly popping out of the radial wall portion 11e on the inner diameter side.

The floating ring 15 is mainly formed by a seal ring 13, a retainer 12 fitted to an outer periphery of the seal ring 13, and permanent magnets 17 (second magnet of the present invention) arranged in an outer periphery of the retainer 12.

The seal ring 13 is a ring-shaped member having a substantially-rectangular section, made of a material having a favorable sliding property such as carbon. An inner peripheral face 13a of the seal ring 13 is formed in a cylindrical face having a minute radial gap h with respect to an outer peripheral face 20a of the rotation shaft 20.

The retainer 12 is an annular member made of a non-magnetic material such as austenite stainless, plastic, and synthetic resin. The retainer 12 adds compression force to the seal ring 13 by being tightly fitted to the outer periphery of the seal ring 13 made of carbon, etc. Thereby, even when the seal ring 13 is made of a brittle material such as carbon, breakage of the seal ring 13 due to contact with the rotation shaft 20, etc. can be prevented. The same number of the permanent magnets 17 as the recessed portions 11g are attached to the outer periphery of the retainer 12 at positions corresponding to the recessed portions 11g of the housing 11 at equal intervals in the circumferential direction.

A supporting means 18 of the present invention is formed by the permanent magnet 17 attached to an outer peripheral portion of the retainer 12, and the pair of permanent magnets 14 attached to the recessed portion 11g of the housing 11. The permanent magnets 14 and the permanent magnets 17 are made of ferrite magnets, neodymium magnets, samarium-cobalt magnets, alnico magnets, praseodymium magnets, etc., and the magnets are selected according to a temperature condition for use and required magnetic force. N magnetic pole faces 14N, 17N and S magnetic pole faces 14S, 17S of the permanent magnets 14 and the permanent magnets 17 are respectively attached to be directed in the circumferential direction so that magnetic flux flows in the circumferential direction. Further, the permanent magnet 17 is attached so that the same poles oppose each other between the pair of permanent magnets 14. The floating ring 15 is accommodated in the space S of the housing 11, and the same magnetic poles repel each other between the permanent magnets 14 and the permanent magnet 17, so that the floating ring 15 is supported while having a circumferential clearance k with respect to the housing 11.

Figure 2A:
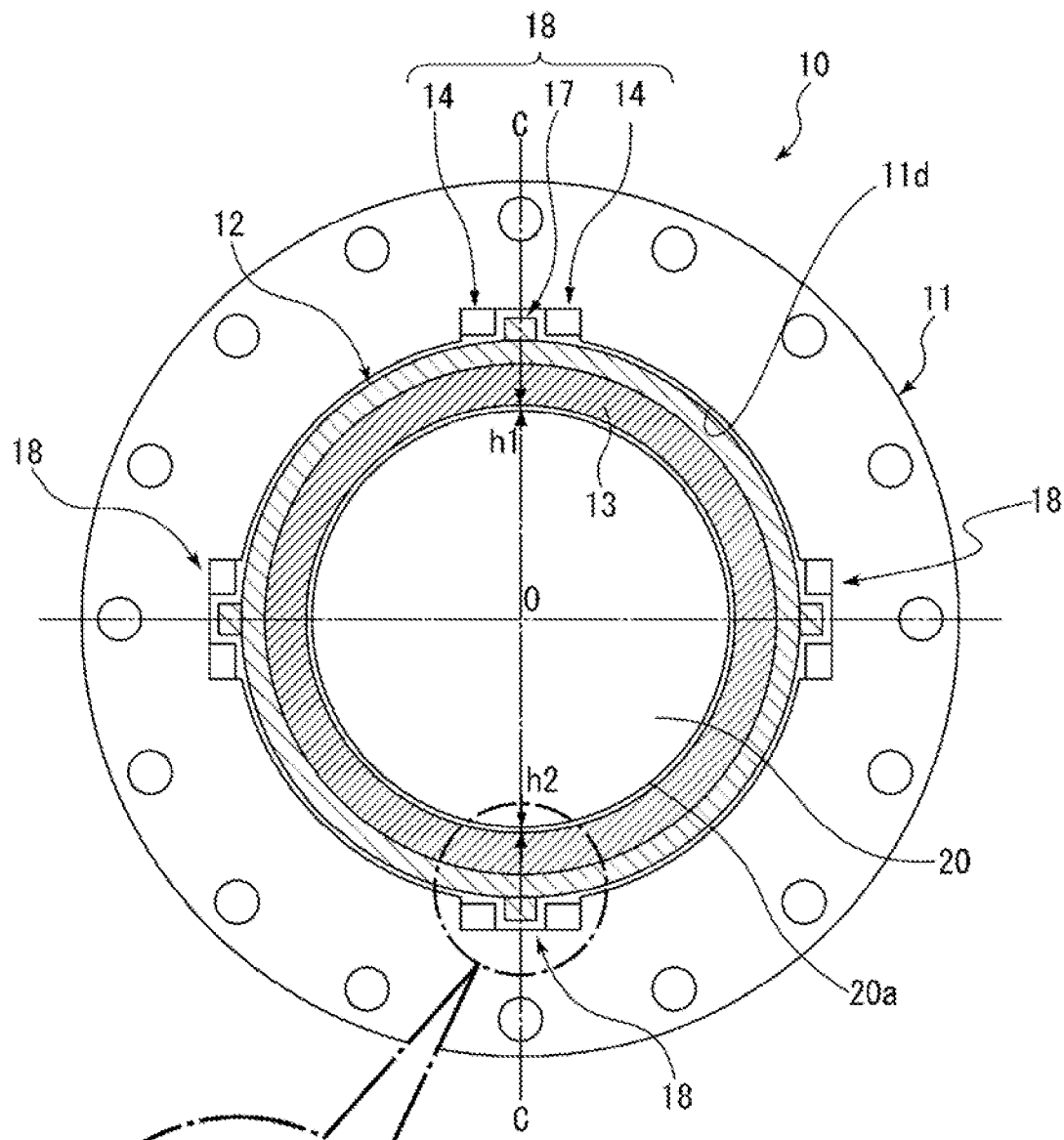
FIG. 2A is a sectional view (side sectional view) taken along the line A-A of FIG. 1.
Figure 2B:
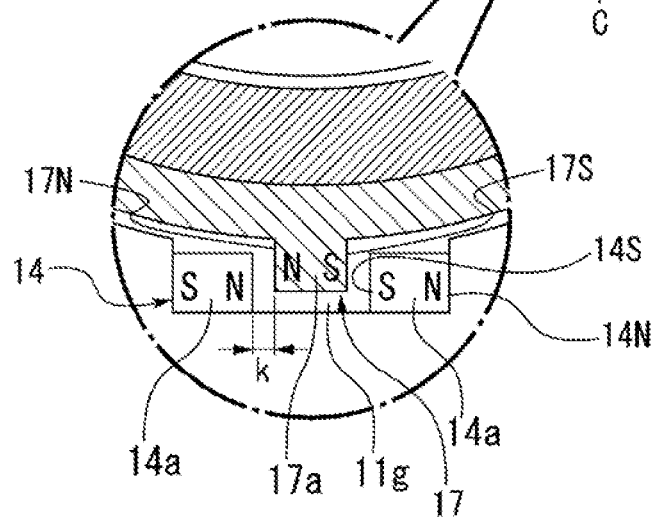
FIG. 2B is an enlarged view of a supporting means.
Figure 3:
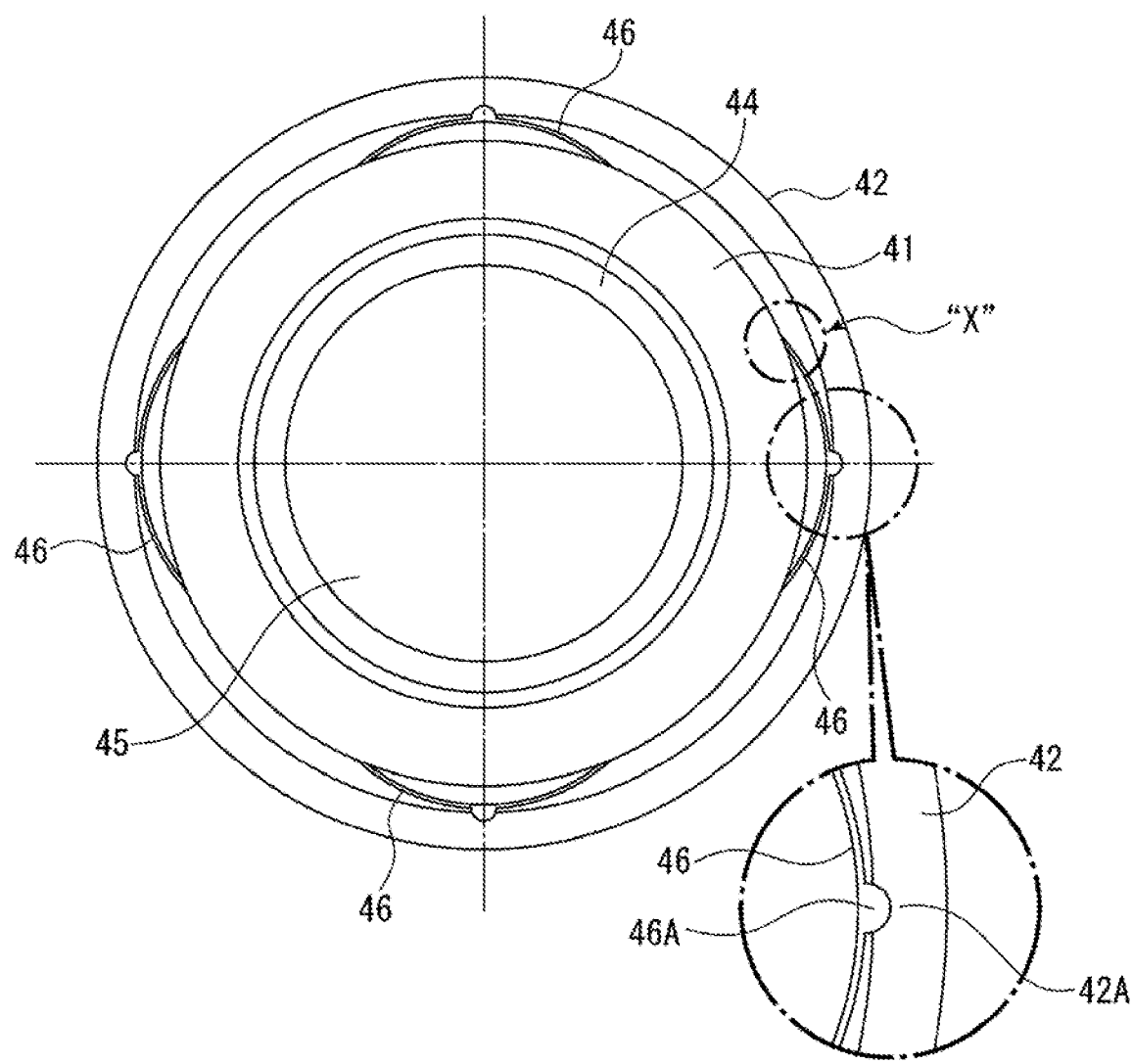
FIG. 3 is a side sectional view of a conventional seal device.

As shown in FIG. 2, the supporting means 18 are attached substantially symmetrically with respect to a vertical line C-C passing through center O of the housing 11. Thus, the floating ring 15 is supported by the supporting means 18 in a non-coupled state, and the supporting means 18 that support in the vertical direction and the supporting means 18 that support in the lateral direction can support without influencing each other. Self-weight of the floating ring 15 can be supported by the pair of supporting means 18 attached in the horizontal direction, and can be held such that displacement between center of the floating ring 15 and the center of the housing 11 is ignorable. Thus, a gap can be held over the entire circumference between the inner peripheral face 13a of the seal ring 13 and the outer peripheral face 20a of the rotation shaft 20. Therefore, when the number of the supporting means 18 (for example, a natural number of two or more), and a type, size, and a shape of the permanent magnets are properly determined so that an upper radial gap h1 between the floating ring 15 and the rotation shaft 20 can be ensured, the floating ring 15 and the rotation shaft 20 can be in no contact with each other even during stoppage. By making the retainer 12 not of austenite stainless but of plastic, synthetic resin, etc., weight of the retainer can be reduced, so that the floating ring 15 can be more easily floated up by magnetic repulsion force between the permanent magnets 14 and the permanent magnets 17 of the supporting means 18. In the present embodiment, the supporting means 18 are arranged at four points on the upper, lower, left, and right sides at equal intervals but may be arranged anywhere as long as the upper radial gap h1 between the floating ring 15 and the rotation shaft 20 can be ensured. For example, the four supporting means 18 of FIG. 2 may be inclined by 45 degrees and arranged substantially symmetrically with respect to the vertical line C-C passing through the center O of the floating ring. In a case where four or more supporting means 18 are arranged, the supporting means may also be arranged substantially symmetrically with respect to the vertical line C-C passing through the center O.

In the permanent magnets 14 and the permanent magnets 17, magnetic pole adjacent faces 14*a*, 17*a* where different magnetic poles are adjacent to each other are covered by a non-magnetic material such as austenite stainless, plastic, and the air. In the magnetic pole adjacent faces 14*a*, 17*a* of the permanent magnets 14 and the permanent magnets 17, the N pole and the S pole are close to each other. Thus, leakage flux in which magnetic flux is short-circuited and flows from the N pole to the S pole is large. Therefore, by covering the magnetic pole adjacent faces 14*a*, 17*a* of the permanent magnets 14 and the permanent magnets 17 by a non-magnetic material having high magnetic resistance, the leakage flux can be reduced, and the magnetic repulsion force between the permanent magnets 14 and the permanent magnets 17 can be enhanced. Plastic and the air have a larger effect of reducing the leakage flux than austenite stainless.

Since the floating ring 15 is biased by a bias means 19 such as a spring, a seal ring side secondary seal face 13*c* and the holder side secondary seal face 11*c* are tightly attached to each other, so that the seal ring 13 and the holder 11*a* are tightly sealed. Hereinafter, a tightly sealing means by tight attachment between the seal ring side secondary seal face 13*c* and the holder side secondary seal face 11*c* will be called as a secondary seal.

Next, operations of the seal device 10 having the above configuration will be described. During stoppage of the rotating fluid machine, the floating ring is supported in the circumferential direction by the magnetic repulsion force between the permanent magnets 14 and the permanent magnets 17 of the supporting means 18, and the self-weight of the floating ring 15 can also be supported. Thus, the inner peripheral face 13*a* of the seal ring 13 of the floating ring 15 is aligned in a state where minute radial gaps h1, h2 are held with respect to the outer peripheral face 20*a* of the rotation shaft 20 (refer to FIG. 2). In such a way, the supporting means 18 can generate force to support both in the circumferential direction and in the radial direction. Thus, even during the stoppage where no wedge effect is generated between the floating ring 15 and the rotation shaft 20, the minute radial gaps h1, h2 are held between the seal ring 13 of the floating ring 15 and the rotation shaft 20. Thereby, wear of the seal ring 13 at the time of start-up of the rotating fluid machine can be prevented. At the time of the stoppage, in the secondary seal, since the floating ring 15 is biased by the bias means 19 such as a spring, tight sealing is made by tightly attaching the seal ring side secondary seal face 13*c* and the holder side secondary seal face 11*c*.

Even during running of the rotating fluid machine, the housing 11 and the floating ring 15 function to hold the circumferential clearance k by the magnetic repulsion force between the permanent magnets 14 and the permanent magnets 17 of the supporting means 18 and to hold the self-weight of the floating ring 15. At this time, even when the upper radial gap h1 is narrowed and the lower radial gap h2 is widened due to an influence of the self-weight of the floating ring 15, dynamic pressure due to the wedge effect is generated in an upper part where the gap is decreased. Thus, alignment is made so that the radial gap h between the floating ring 15 and the rotation shaft 20 is uniform.

When the rotation shaft 20 runs out by vibration, by both the magnetic repulsion force between the permanent magnets 14 and the permanent magnets 17 of the supporting means 18 and the dynamic pressure due to the wedge effect, the seal ring 13 of the floating ring 15 and the rotation shaft 20 function to hold the radial gap h. Thus, the floating ring 15 exerts an effect of also regulating movement of the rotation shaft 20, so that vibration of the rotation shaft 20 can be reduced.

During the running, since the floating ring 15 is pressed further by pressure from the high pressure fluid side to the low pressure fluid side in addition to pressing force of the bias means 19, the seal ring side secondary seal face 13*c* and the holder side secondary seal face 11*c* are further tightly attached to each other. Thus, a sealing effect of the secondary seal is further enhanced.

The present invention exerts the following excellent effects.

During the stoppage of the rotating fluid machine, by the magnetic repulsion force of the supporting means 18, the seal ring 13 of the floating ring 15 and the rotation shaft 20 function to hold the radial gap h. Thus, even at the time of the start-up of the rotating fluid machine, wear of the seal ring 13 can be prevented. During the running of the rotating fluid machine, even when the radial gap h between the floating ring 15 and the rotation shaft 20 becomes non-uniform in the circumferential direction, the dynamic pressure due to the wedge effect is generated in the part where the gap is decreased. Thus, alignment is made so that the radial gap h between the floating ring 15 and the rotation shaft 20 is uniform. Thereby, during the stoppage and during the running, a favorable sealing state can be obtained, so that wear of the seal ring 13 can be prevented.

The floating ring 15 arranged on the inner diameter side of the housing 11 has the gap with respect to the housing 11 and in no contact with the housing. Thus, a tool, etc. for attachment is not required, and only by inserting into the housing 11, the floating ring can be simply arranged inside the housing.

Even when the rotation shaft 20 runs out by vibration, by both the magnetic repulsion force between the permanent magnets 14 and the permanent magnets 17 of the supporting means 18 and the dynamic pressure due to the wedge effect, the seal ring 13 of the floating ring 15 and the rotation shaft 20 function to hold the radial gap h. Thus, the floating ring 15 exerts the effect of also regulating the movement of the rotation shaft 20, so that the vibration of the rotation shaft 20 can be reduced.

By the magnetic repulsion force of the supporting means 18, the floating ring 15 functions to hold the circumferential clearance k to be fixed in no contact with the housing 11. Thus, without being anchored to the floating ring 15 and the housing 11, the supporting means 18 can exert the function for a long time.

The magnetic pole adjacent faces 14*a*, 17*a* of the permanent magnets 14 and the permanent magnets 17 are covered by a non-magnetic material. Thus, the leakage flux is reduced, so that the repulsion force between the permanent magnets 14 and the permanent magnets 17 can be efficiently enhanced.

The seal ring 13 is made of a material excellent in a self-lubricating property and a sliding property such as carbon. Thus, even when the seal ring is always relatively displaced with respect to the holder side secondary seal face 11*c* during the running, wear, surface roughening, etc. can be prevented, so that the function of the secondary seal can be maintained over a long time.

The embodiment of the present invention is described above with the drawings. However, specific configurations are not limited to the embodiment but the present invention includes modifications and additions within a range not departing from the gist of the present invention.

For example, in the above embodiment, the floating ring 15 is an annular integrated body. However, the present invention is not limited to this but members formed by dividing in the circumferential direction may be assembled into an annular integrated body.

In the above embodiment, the floating ring 15 is biased by the bias means 19. However, without using the bias means 19, the seal ring side secondary seal face 13c and the holder side secondary seal face 11c may be further tightly attached to each other by the pressure from the high pressure fluid side to the low pressure fluid side, so as to form the secondary seal.

In the above embodiment, the supporting means 18 is formed by the permanent magnet 17 attached to the outer peripheral portion of the retainer 12 and the permanent magnets 14 attached to the inner peripheral portion of the flange 11b of the housing 11. However, the present invention is not limited to this. For example, a permanent magnet may be attached to the outer peripheral portion of the retainer 12 and electromagnets may be attached to the inner peripheral portion of the flange 11b of the housing 11.

In a case where a working fluid of a pump is a super-low-temperature fluid such as liquid helium, superconducting magnets or normally-conducting electromagnets may be used in place of the permanent magnets. The magnets have the flux pinning effect in a superconducting state. Thus, an effect of supporting a radial position and an axial position of the floating ring can be further enhanced.

The present invention is mainly used for the purpose of the seal device but may be used as a damping device that damps vibration of a shaft.

REFERENCE SIGNS LIST

10 Seal device
11 Housing
11a Holder
11b Flange
12 Retainer
13 Seal ring
14 Permanent magnet (first magnet)
14N, 14S Magnetic pole face
14a Magnetic pole adjacent face
15 Floating ring
17 Permanent magnet (second magnet)
17N, 17S Magnetic pole face
17a Magnetic pole adjacent face
18 Supporting means
19 Bias means
20 Rotation shaft
21 Casing
22 Fastening means
S Space
k Circumferential clearance
h Radial clearance
C-C Vertical line

The invention claimed is:

1. A seal device that seals between a housing and a rotation shaft passing through the housing, the seal device comprising:
 a floating ring arranged with a gap with respect to the rotation shaft;
 and
 at least one supporting means that supports the floating ring contactlessly in a circumferential direction,
 wherein the at least one supporting means comprises: a first magnet arranged in the housing and having magnetic pole faces each directed in the circumferential direction; and a second magnet arranged in the floating ring and having magnetic pole faces each directed in the circumferential direction, said first magnet and said second magnet being arranged in a manner that each magnetic pole face of the first magnet and each magnetic pole face of the second magnet which face each other have a same magnetic pole, and
 wherein the floating ring comprises: a seal ring; a retainer being an annular member made of a non-magnetic material and fitted to and covering a radially outer circumference of the seal ring; and the second magnet which is arranged in a radially outer circumference of the retainer.

2. The seal device according to claim 1, wherein the magnetic pole faces of the first magnet have different magnetic poles and are aligned in the circumferential direction, the magnetic pole faces of the second magnet have different magnetic poles and are aligned in the circumferential direction, wherein each magnetic pole face of the first magnet and each magnetic pole face of the second magnet which face each other in the circumferential direction have a same magnetic pole.

* * * * *

UNITED STATES PATENT AND TRADEMARK OFFICE
CERTIFICATE OF CORRECTION

PATENT NO. : 11,078,919 B2
APPLICATION NO. : 16/483655
DATED : August 3, 2021
INVENTOR(S) : Yuichiro Tokunaga et al.

Page 1 of 1

It is certified that error appears in the above-identified patent and that said Letters Patent is hereby corrected as shown below:

In the Claims

At Column 8, Line 19, in Claim 1, a word --and-- should be inserted after the ";".
At Column 8, Line 20, in Claim 1, the word "and" should be deleted.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*